Oct. 28, 1969  D. E. BURROUGH ET AL  3,474,601
CROP HARVESTER AND CONDITIONER

Filed April 6, 1967  2 Sheets-Sheet 1

INVENTOR.
D. E. BURROUGH &
T. M. BARNES

Oct. 28, 1969  D. E. BURROUGH ET AL  3,474,601
CROP HARVESTER AND CONDITIONER

Filed April 3, 1967  2 Sheets-Sheet 2

INVENTOR
D E. BURROUGH &
T. M. BARNES

United States Patent Office 3,474,601
Patented Oct. 28, 1969

3,474,601
CROP HARVESTER AND CONDITIONER
Donald E. Burrough and Theodore Marion Barnes, Ottumwa, Iowa, assignor to Deere & Company, Moline, Ill., a corporation of Delaware
Filed Apr. 6, 1967, Ser. No. 628,938
Int. Cl. A01d 57/00
U.S. Cl. 56—1                                    10 Claims

ABSTRACT OF THE DISCLOSURE

A pull-type combination mower conditioner and windrower having a transverse mower bar, a transverse reel above the mower bar for sweeping the crop thereto and then upwardly and rearwardly to a pair of conditioner rolls, which crush or crimp the crop and throw it rearwardly onto the ground or against rearwardly disposed windrower shields, which deflect the crop into a windrow, the mower bar, reel, and conditioner rolls being mounted on a floating-type partly counterbalanced header, the counterbalancing force being transmitted to the header through the conditioner rolls to provide the roll pressure.

BACKGROUND OF THE INVENTION

This invention relates to a combination harvester and crop conditioner having a mobile main frame carrying a forwardly disposed floating header, which supports a forward mower bar, a harvester reel above the mower bar, and a pair of crop conditioner rolls disposed rearwardly of the mower bar, the invention residing in improved means for counterbalancing and supporting the header and providing roll pressure for the conditioner rolls.

Combination mower conditioners are well known, most of the more recent designs of such mower conditioners including a mobile frame carrying a floating-type header, which supports a harvester reel, a cutter bar below the reel for severing the crop from the field, and a pair of conditioner rolls rearwardly of the cutter bar for crushing or crimping the crop after it is severed from the field and throwing it rearwardly back to the field. The floating-type header normally rides on the ground to permit the harvest of the crop close to the ground and is swingable in a vertical arc about a transverse pivot to permit the header to follow the contour of the ground and to raise upon striking an obstruction or for transport of the machine. To tion, one or more springs are conventionally provided to counterbalance most of the weight of the header. In addition, separate springs have been provided to bias one roll toward the other, to provide the necessary roll pressure while permitting the rolls to separate to pass slugs of the crop or foreign material.

SUMMARY OF THE INVENTION

According to the present invention, a single spring means is provided for both counterbalancing the header and providing roll pressure, thereby eliminating one set of springs with a consequent reduction of cost and complexity of the machine. Another feature of the invention resides in the provision of adjusting means for adjusting the amount of header counterbalance or adjusting the roll pressure independently of the counterbalance. Another advantage of the invention is that when the header is almost totally counterbalanced, it will automatically raise when the conditioner rolls encounter a slug of material, facilitating the clearing of the machine. Other features of the machine reside in the provision of an adjustable stop for establishing the minimum clearance between the rolls and the mounting of the movable conditioner roll for swinging about a transverse axis coaxial with the pivot axis of the header.

DESCRIPTION OF THE PREFERRED EMBODIMENT

Figure 1:
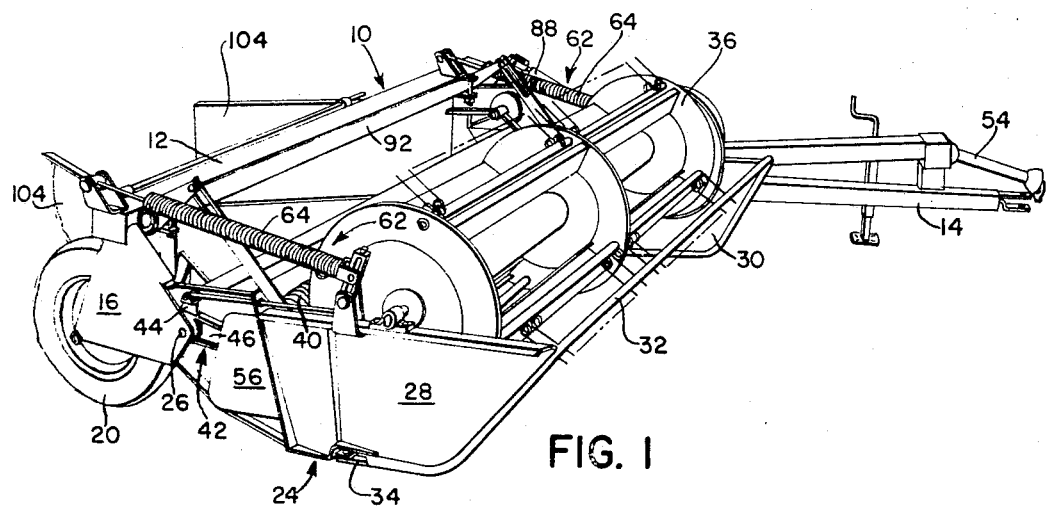
FIG. 1 is a right front perspective view of the combination crop harvester and conditioner embodying the present invention.

The machine chosen for purposes of illustration includes a main frame, indicated in its entirety by the numeral 10, and including a rearward transverse beam 12, the left end of which is connected to a generally fore-and-aft extending draft member 14. Right and left wheel support structures 16 and 18 respectively are mounted on the opposite ends of the transverse beam 12 and respectively support right and left wheels 20 and 22. It is to be understood that such terms as "right," "left," and "transverse" are with reference to the direction of machine travel and that such terms, as well as terms such as "upwardly," "downwardly," "forwardly," "rearwardly," etc. are used to more clearly describe the invention, and not to be construed as limitations.

A forwardly disposed floating-type header, indicated in its entirely by the numeral 24, is carried by the main frame on a transverse pivot 26 for swinging in a fore-and-aft vertical arc, the pivot 26 being formed by a pair of coaxial pins respectively mounted on the frame at opposite sides of the header. The header 24 includes upright, fore-and-aft extending right and left side panels 28 and 30 respectively, connected at their forward end by a transverse knockdown bar 32 and having their rearward end supported on the pivot 26. An elongated, transverse mower bar 34 is supported by and extends between the lower edges of the side panels 28 and 30 and an axially transverse reel 36, of conventional construction, is journaled at its opposite ends on the upper edges of the side panels 28 and 30 generally above the mower bar 34 and rearwardly of the knockdown bar 32. Also journaled at opposite ends in the side panels 28 and 30 is an axially fixed conditioner roll 38, the conditioner roll 38 being parallel to and coextensive with the conditioner roll 38 and is mounted for movement toward and away from the fixed conditioner roll on a pair of bell cranks 42. The bell cranks 42 are swingably mounted on the pivot 26 at the opposite ends of the header, and each bell crank includes a generally upright arm 44 and a forwardly extending arm 46, the forward end of which journals the opposite ends of the conditioner roll 40, the opposite ends of the conditioner roll extending through acruate slots 48 in the side panels, which permit the movement of the roll 40 toward and away from the conditioner roll 38 in a generally upright arc about the pivot 26.

Figure 2:
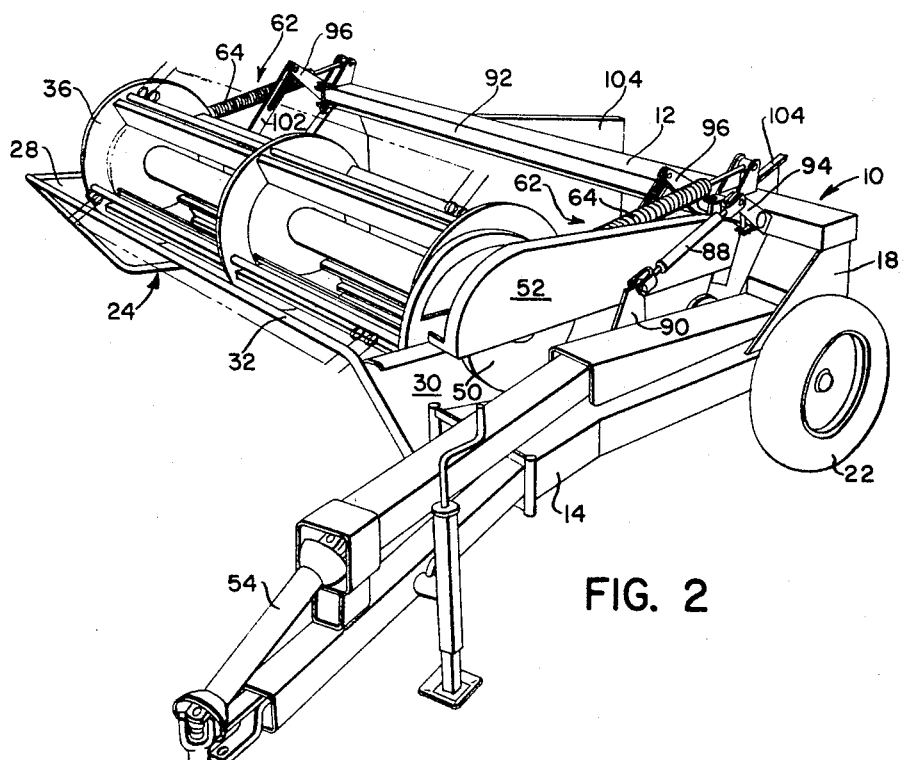
FIG. 2 is a left front perspective view of the machine.
Figure 3:
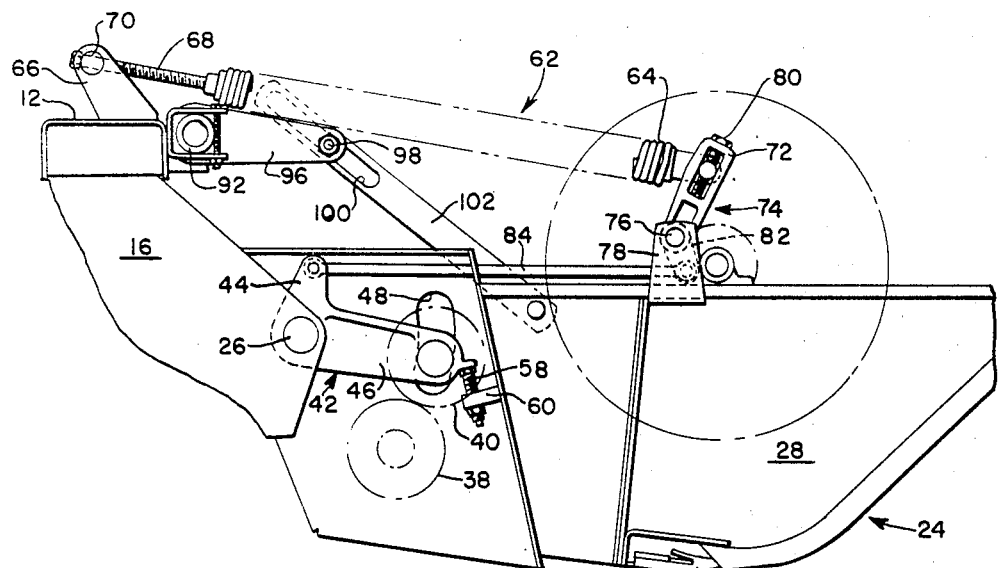
FIG. 3 is a partial right-hand side elevation view of the machine with some of the shielding removed to more clearly disclose the invention and with the header in its lowered, ground-engaging or operating position.
Figure 4:
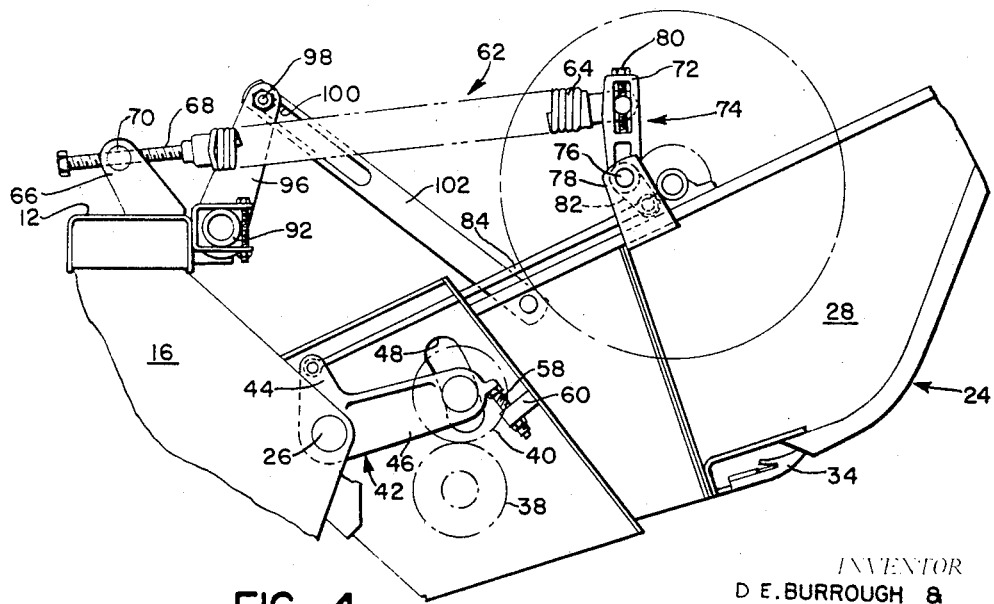
FIG. 4 is a view similar to FIG. 3, except that the header is shown in its elevated or transport position.

The opposite ends of the header 24 are substantially identical, the left side of the header being a mirror image of the right side of the header which is illustrated in FIGS. 1, 3, and 4, except that the drives for the reel, mower bar, and conditioner rolls are located on the left side of the header, only a portion of the reel drive 50, which is partly shielded by the shield 52, being shown in FIG. 2. The drives are of conventional construction and are connected to and driven by a power take-off mechanism via the shielded drive train 54, the machine being attached to the tractor via the draft member 14. The right side panel 28 includes a small shield 56 which abuts the right end of the conditioner rolls and is removed for purposes of clarity in FIGS. 3 and 4.

The conditioner rolls are of conventional construction and are not shown in detail in the drawings. Such rolls can be relatively smooth to crush the crop as it passes between the rolls, or the meshing fluted construction to crimp the crop as it passes between the rolls, or a combination of the two. The minimum clearance between the rolls is established by an adjustable stop 58, here shown as a bolt threadable in a bracket 60 mounted on the side panels to vary the projection of the bolt, the upper end of the bolt engaging the forward end of the fore-and-aft arm 46 which carries the upper or movable conditioner roll 40. As is apparent from FIGS. 3 and 4, the minimum clearance between the rolls can be increased by threading the bolt upwardly from the bracket 60.

The weight of the header would, of course, tend to cause the forward end of the header to swing downwardly about the pivot 26, and at least part of the weight of the header is supported by a pair of identical connecting mechanisms 62 between the frame and the opposite ends of the header. Since the mechanisms 62 are identical, only one mechanism is shown in detail in the drawings and will be described herein. Each connecting mechanism includes a generally fore-and-aft tension-type coil spring 64 having its rearward end attached to an upright bracket 66 on the transverse beam 12 of the main frame by an axial bolt 68, the head of which engages and the shank of which is slidable through a transverse pivot 70 carried by the bracket 66, the bolt 68 being threadable in the rearward end of the spring 64 to adjust the distance between the end of the spring and the pivot 70 and thereby the load on the spring. The forward end of the spring 64 is connected to a generally upright arm 72 of a bell crank 74 rockably mounted on the header on a transverse pivot 76 supported by an upright bracket 78 extending upwardly from the side panel. The spring is connected to the arm 72 by a bolt 80 rotatable in the arm, the threaded portion of the bolt 80 engaging the forward end of the spring to move the connecting point up and down the lever arm 72, thereby providing a means of adjusting the moment arm of the spring. The bell crank 74 also includes a downwardly extending arm 82, the lower end of which is connected to the upper end of the arm 44 by a rigid fore-and-aft extending rod 84, the connection at both the forward and rearward end of the rod to the respective lever arms being through a transverse pivot.

The header 24 can be raised or lowered about its pivot 26 by a lift mechanism which includes a force-exerting device 88, here shown as a hydraulic cylinder adapted to be connected to and powered by the tractor hydraulic system by hydraulic hoses (not shown), the forward end of the force-exerting device 80 being connected to the frame by an upright bracket 90, while the rearward end of the force-exerting device is connected to a transverse rockshaft 92 by a lever arm 94, so that extension of the device 88 rotates the rockshaft 92 in a clockwise direction as viewed from the left-hand side of the machine. The rockshaft 92 is connected to the header by a pair of parallel lever arms 96, which are rigidly secured thereto and carry transverse pins 98, which respectively slide in elongated slots 100 in the rearward ends of a pair of links 102, the forward ends of which are respectively pivotally connected to the side panels 28 and 30. As is apparent from the drawings, the movement of the pins 98 in the slots 100 provide a lost motion connection so that the header is free to raise or lower for any given position of the rockshaft 92 until the pins 98 engage the opposite ends of the slot.

In operation, the machine is towed through a field of standing crops, such as hay or the like, and as it advances, the reel 36 bends the crop downwardly and moves it rearwardly to the mower bar 34, which severs the crop from the field, the reel moving the severed crop rearwardly and upwardly to the counter-rotating conditioner rolls, between which the crop passes and is crushed or crimped thereby. The conditioner rolls project the crop rearwardly and after traveling a relatively short distance, the crop returns to the ground. A pair of rearwardly converging windrower shields 104 is provided to deflect the crop inwardly so that it is deposited on the ground in a windrow rather than a full swath.

During operation of the machine, the lower edge of the header normally rides along the ground, and the force-exerting device 88 is retracted so that the pins 98 are spaced from the opposite ends of the slot 100, whereby the header will float downwardly or upwardly until the pins engage the opposite ends of the slots. Thus, the header is free to follow the contour of the ground. In this position, of course, the lift mechanism does not support any of the weight of the header so that the entire weight of the header is supported either by the ground or the connecting mechanism 62.

As is apparent from FIGS. 3 and 4, the weight of the header exerts a downward force on the pivots 76, and, since the upper arms 72 of the bell cranks 74 are urged rearwardly by the springs 64, this downward force tends to rotate the bell cranks about the pivots 76, the direction of rotation being such that the rods 84 would move forwardly to rotate the bell cranks 42 about their pivot 26, urging the upper conditioner roll 40 downwardly toward the lower conditioner roll 38. Of course, when the bell cranks 42 engage the stops 58, the rods 84 will not shift, locking the bell cranks 74, so that the weight of the header stretches the springs 64, which opposes the downward movement of the header. As previously described, the preload on the springs 64 can be adjusted by means of the bolts 68 to vary the amount of force exerted thereby for a given position of the header about its pivot 26. Normally the spring load is adjusted so that the header engages the ground before the spring deflection entirely counterbalances the header, although it is desirable that the weight of the header be almost totally counterbalanced when it engages the ground, the weight of the header supported by the ground, preferably being only enough to permit the header to follow the ground contour without excessive bouncing of the header. Of course, the springs 64 could be preloaded so that the connecting mechanisms will support the entire weight of the header, maintaining the header a short distance above the ground.

As is also apparent from the drawings, the force due to the deflection of the springs is transmitted by the bell cranks 74, the rods 84, and the bell cranks 42 to urge the upper conditioner roll 40 toward the lower conditioner roll 38, thereby providing the necessary roll pressure to condition the crop. For a given spring deflection or counterbalancing force, the roll pressure force can be varied by adjusting the connection of the springs 64 along the lever arms 72 by means of the adjusting bolts 80, the further the point of attachment of the springs 64 from the pivots 76, the larger the lever arm of the spring force, and consequently the greater the force transmitted to the upper roll 40.

To raise the header for elevated operation, or to clear an obstruction, or for transport of the machine, the force-exerting device 88 is extended, rotating the rockshaft 92 and causing the lever arms 96 to move upwardly and rearwardly. When the pins 98 engage the upper end of the slots 100, as shown in FIG. 4, additional rotation of the rockshaft will raise the header 24 about its pivot 26. The springs 64 assist the raising of the header until they reach their undeflected length, at which point additional raising of the header will cause the shanks of the bolt 68 to slide through the pins 70, as shown in FIG. 4.

Other features and advantages of the invention will readily occur to those skilled in the art, as will many modifications and alterations in the preferred embodiment of the invention described herein, all of which may be achieved without departing from the spirit and the scope of the invention.

We claim:

1. A combination crop harvester and conditioner comprising: a mobile main frame adapted to advance over a field and carrying a transverse pivot means; a transversely elongated header swingably mounted on the pivot means for swinging in a vertical arc between a lowered ground-engaging position and an elevated ground-clearing position and including a forwardly disposed, transversely elongated harvesting means adaptable to remove a swath of crop from the field and deliver it rearwardly; a first axially transverse crop conditioner roll journaled on the header rearwardly of the harvesting means; a second crop conditioner roll; means for rotatably mounting the second crop conditioner roll parallel to and coextensive with the first crop conditioner roll and for movement toward and away from said roll; and connecting means between said mounting means and the frame to support at least a part of the weight of the header and transmit the force exerted by the weight of the header so supported to the mounting means to bias the second roll toward the first roll.

2. The invention defined in claim 1 wherein the connecting means includes a series-connected spring means and linkage means between the frame and the mounting means, the spring means deflecting as the header swings downwardly and exerting an upward counterbalancing force on the header.

3. The invention defined in claim 2 and including a lift means operative between the frame and the header and adapted to selectively raise the header from its ground-engaging position to its elevated position.

4. The invention defined in claim 3 wherein the lift means includes a lost motion mechanism operative to permit limited upward movement of the header independent of the lift means.

5. The invention defined in claim 4 and including a stop means mounted on the header and operatively associated with the mounting means to limit the movement of the second conditioner roll toward the first roll and establish a minimum clearance between the rolls.

6. The invention defined in claim 5 wherein the spring means includes float adjusting means operative to selectively vary the spring means deflection for a given position of the header relative to the frame, and thereby vary the header counterbalance.

7. The invention defined in claim 6 wherein the linkage means includes lever means adaptable to transmit the force exerted by the spring means, and roll pressure adjusting means operatively associated with the lever means for selectively varying the moment arm of the lever means and the conditioner roll biasing force exerted by the spring means through said lever means for a given spring deflection.

8. The invention defined in claim 1 wherein the harvesting means includes a forwardly disposed reel mounted on the header forwardly of, axially parallel to, and substantially coextensive with the conditioner rolls, and a transversely elongated cutter bar mounted on the header proximate to the ground in the lower ground-engaging position of the header and generally coextensive with and below the reel.

9. The invention defined in claim 8 wherein the connecting means includes a pair of generally fore-and-aft tension springs having their rearward ends connected to the frame and their forward ends respectively connected to the opposite ends of the header by a pair of linkages connected in turn to the mounting means, each spring deflecting as the header swings downwarly to its ground-engaging position to exert an upward counterbalancing force on the header and a roll pressure force on the mounting means, urging the second conditioner roll toward the first.

10. The invention defined in claim 1 wherein the mounting means includes a pair of lever arms pivotally mounted on the main frame at opposite ends of the header on a transverse pivot means coaxial with the header pivot, and journaling the opposite ends of the second conditioner roll for rotation on an axis parallel to said pivot means.

References Cited

UNITED STATES PATENTS

| | | |
|---|---|---|
| 3,014,327 | 12/1961 | Bummetal. |
| 3,116,582 | 1/1964 | Wathen et al. |
| 3,293,835 | 12/1966 | Gehman et al. |
| 3,375,643 | 4/1968 | McCarty et al. |
| 3,397,520 | 8/1968 | Johnston et al. |

ANTONIO F. GUIDA, Primary Examiner